Sept. 22, 1959 W. B. MILLER 2,905,048
DEVICE AND METHOD FOR FILM EDITING
Filed Nov. 16, 1955 2 Sheets-Sheet 1
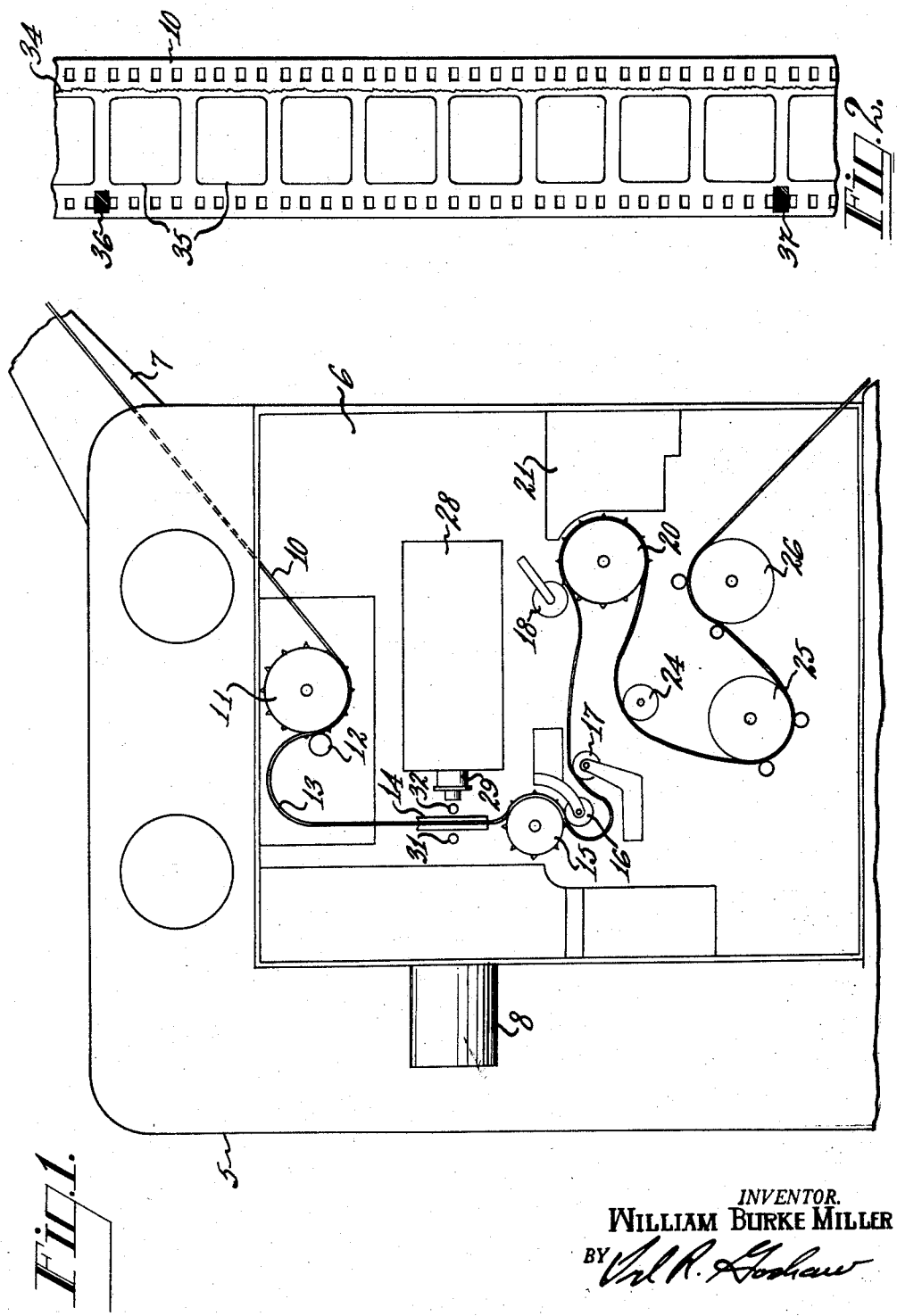
INVENTOR.
WILLIAM BURKE MILLER
BY
ATTORNEY Sept. 22, 1959 W. B. MILLER 2,905,048
DEVICE AND METHOD FOR FILM EDITING
Filed Nov. 16, 1955 2 Sheets-Sheet 2
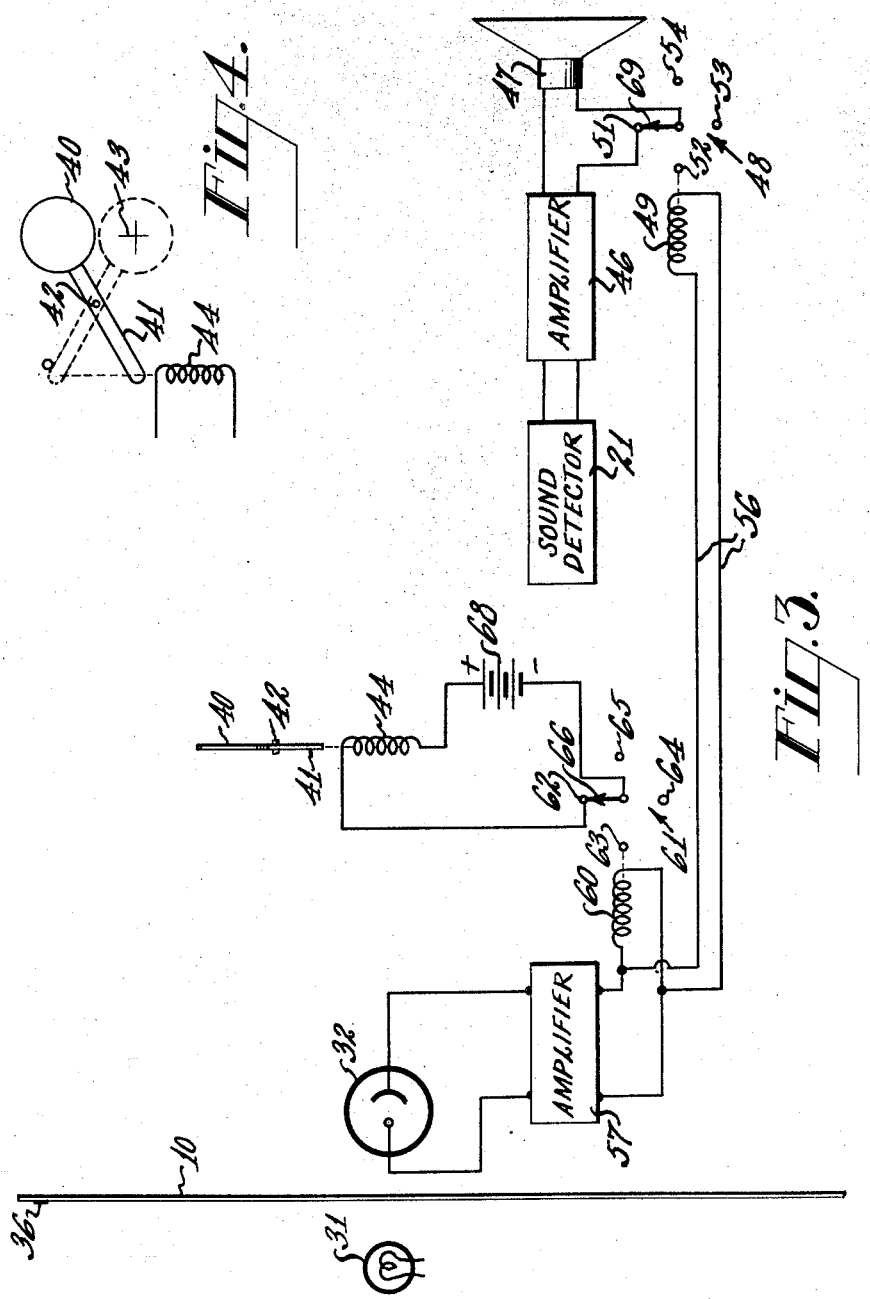
INVENTOR.
WILLIAM BURKE MILLER
BY
ATTORNEY

# United States Patent Office 2,905,048
Patented Sept. 22, 1959

2,905,048

DEVICE AND METHOD FOR FILM EDITING

William Burke Miller, Scarsdale, N.Y., assignor to Radio Corporation of America, a corporation of Delaware Application November 16, 1955, Serial No. 547,084

6 Claims. (Cl. 88—16)

This invention relates to film editing, and particularly to a film projection system which permits the rapid, tentative editing of a film for subsequent cutting and splicing.

In the editing of film for transmission by television, the final cut of the film must generally have a predetermined length or projection time in order to fit within the time periods of television programs. This applies to both newsreels and story films. For example, if a film must be projected within a time period of ten minutes and the entire film, at the normal speed of projection, takes twelve minutes, the editor must eliminate certain portions of the film so that its time of projection is only ten minutes. The present invention is especially useful for accomplishing rapidly the cutting operation which is generally necessary with news films produced for television release and brought in late.

The first step is to obtain by projection a tentative cutting by marking certain lengths of the film for elimination during subsequent projection. This cutting is made by marking the beginnings and ends of sequences or portions of the film to be eliminated with a pigmented pencil which will provide an opaque mark and prevent the transmission of light through the film. The marking of the film is done while it is in the projector so that rethreading is avoided. After the portions to be eliminated have been so marked to provide the desired projection time, the complete roll is projected, the projector eliminating the picture and sound of the marked portions while the film continues to run through the projector. The editor will then obtain an idea of whether his selections still provide satisfactory story continuity, since only the portions retained will be seen and heard. Most of the portions eliminated will be short and, by natural eye retention, the eliminated sections will not interfere appreciably with the complete story. The elimination of larger sections will not prevent an experienced editor from retaining the story. After the editor, in his opinion, has made his final tentative cuts in this manner, the actual film is then cut at the marks and spliced to provide a film of the proper length.

The principal object of the invention, therefore, is to facilitate the cutting or editing of motion picture film.

Another object of the invention is to provide an improved editing method of and system for rapidly editing a motion picture film to a certain length.

A further object of the invention is to provide an improved method of and system for obtaining a tentative editing of the film before the actual cutting and splicing of the film is made.

The novel features which are believed to be characteristic of this invention, both as to the manner of its organization and the mode of its operation, will be better understood from the following description when read in conjunction with the accompanying drawings, in which:

Fig. 1 is an elevational view of a motion picture projector embodying the invention;

Fig. 2 is a partial view of a marked film as used in the invention;

Fig. 3 is a schematic view of the electrical circuit used in the invention; and

Fig. 4 is a detail view of the picture light control unit used in the invention.

Referring, now, to the drawings in which the same reference numerals identify like elements, any standard film projector is represented by a casing 5, a panel 6, a portion of a film reel arm 7, and a picture projector lens unit 8. A film 10 to be edited is shown passing around a sprocket 11, held thereon by a pad roller 12, and then to a loop 13 and to a projection gate 14. The film is advanced through gate 14 by an intermittent sprocket 15 and held thereon by a pad roller 16. The film then passes over a guide roller 17 and under a pressure roller 18 to a continuous sprocket 20 where the sound on the film may be reproduced by sound unit 21. The film then passes around rollers 24, 25, and 26 to a takeup reel not shown.

The light for projecting the pictures is housed in a unit 28 having a projection lens unit 29 along with a dowser 40 (Figs. 3 and 4). Also shown in Figs. 1 and 3 are an exciter lamp 31 and a photocell 32 which may be in the form of a unit to pass light through the edge of the film away from the sound track 34 shown in Fig. 2. That is, the unit 31—32 may be an adjunct attachable to and detachable from the projector, or it may be built into the projector.

Fig. 2 shows the film 10 with its picture frames 35 and opaque marks 36 and 37 which are placed on the film to indicate the section of the film to be eliminated when the film is reprojected. The circuit for eliminating this section of the film from projection and sound reproduction, as shown in Fig. 3, will now be described.

The projector has, within the light supply unit 28, the dowser 40 which is an opaque shutter on an arm 41 pivoted on a pin 42. The dowser is normally in the light path as shown by the cross 43 within the dotted lines and, upon energization of a solenoid 44, is removed from the light path to permit the projection of the picture.

Referring, now, to the sound portion of the system, this has been shown diagrammatically by sound detector 21 and an amplifier 46 connected thereto and to a speaker 47 through a rotary switch 48 having an actuating coil 49, four contacts 51, 52, 53, and 54, and a rotary contactor 69. The coil 49 is connected in parallel with a coil 60 of a second rotary switch 61 over conductors 56 and to the output of an amplifier 57 which is fed by the photoelectric cell 32. The switch 61 has four contacts 62, 63, 64, and 65 and a rotary contactor 66. Through the rotary contactor 66 of the switch 61, the coil of the solenoid 44 is energized over a battery 68. The rotary contactor 69 of the switch 48 connects the amplifier 46 to the loud speaker 47 when on the contact 51.

In the operation of this circuit, the light passing through the film causes the energization of coils 49 and 60. Upon the energization and de-energization of these coils, the respective rotary contactors 66 and 69 are moved two steps. Thus, as the portions of the film 10 to be seen and heard go through the gate 14, the contactor 66 is on the contact 62 and the contactor 69 is on the contact 51. Now when a mark such as the mark 36 eliminates light from the cell 32, the de-energization of the coil 60 permits the spring bias of the switch 61 to rotate the contactor 66 to the contact 63, and the spring bias of the switch 48 to rotate the contactor 69 to the contact 52. This allows the dowser to return to its position shown in the dotted lines in Fig. 4 to cut off the picture from an observation screen and to break the circuit between the amplifier 46 and the speaker 47. Thus, the picture will be eliminated from the screen and the sound will be cut off from the speaker.

Now, after the mark 36 has passed the light path between the lamp 31 and the cell 32, the coils 60 and 49 will again be energized and the rotary contactor 66 will be removed to the contact 64, and the contactor 69 will be moved to the contact 53. However, since these respective contacts are not connected to the coil 44 and to the amplifier 46 and speaker 47, the picture will not be returned to the screen nor will be sound be reproduced. When it is desired to have the next portion of the picture and sound returned for observation and reproduction, respectively, use is made of the mark 37 at the point of restoration. The mark 37 will cut off the light from the cell 32 and, as just described, will move the contactor 66 to the contact 65, and the contactor 69 to the contact 54. The picture and sound will still not be restored until the light is again impressed on cell 32 which will occur as soon as the mark 37 moves out of the light beam, and which will cause the respective contactors 66 and 69 to move back to their respective contacts 62 and 51. The next pair of marks will cycle the switches in the same manner as just described to eliminate that portion of the film which lies between them and so on for other portions during the continuous advancement of the entire roll of film.

The above system, therefore, will permit rapid, tentative editing of a roll of film while in the projector by simply placing pigmented pencil marks on the film which may be easily removed at any time during the tentative editing and after the film is finally cut and spliced. By the simple operation of marking the film in this manner, several tentatively edited versions of the film may be rapidly observed so that, when finally cut, the best version is obtained. Although one specific circuit has been shown for eliminating the picture and sound of selected portions, other circuits may also be used.

I claim:

1. The method of controlling the projection for observation of certain portions of a roll of motion picture film which comprises first continuously projecting an entire roll of film for observation of said entire roll, marking with marks opaque to light the beginnings and ends of certain portions of said roll of film desired to be eliminated from observation during a second continuous projection of said roll of film, again continuously projecting said entire roll of film for observation of certain other portions of said film and eliminating light from said marked portions during the second projection of said marked film to prevent observation of said marked portions, the elimination and restoration of light from said film being under control of said marks.

2. The method in accordance with claim 1 in which said sound film is reproduced during the observation of said certain other portions of said roll of film, sound on said marked portions being eliminated from reproduction during the elimination from observation of said marked portions of said film.

3. A system for eliminating from observation selected portions of a roll of motion picture film having at the beginnings and ends of said selected portions marks adapted to interrupt light, said system comprising a motion picture projector to advance said marked roll of film therethrough, said projector having a first light path through an aperture thereof through which a certain longitudinal portion of said roll of film is positioned, a control circuit having elements forming a second light path, said marks being disposed on said film to interrupt light in said second light path at the beginnings and ends of said selected portions of said roll of film, circuit means responsive to the impression and elimination of light passing through said film in said second light path by said marks for eliminating light from said aperture and said longitudinal portion of said film in said first light path during the passage of said selected portions of said film through said aperture of said projector, said circuit means including a relay actuated by the impression and elimination of light by said marks in said second light path, and mechanical means for eliminating light in said first light path from said film when one of said marks passes through said second light path and restoring light in said first light path when a succeeding mark passes through said second light path, said mechanical means including a dowser actuated by said relay.

4. A system in accordance with claim 3 in which said elements are a light source and a photoelectric cell between which the portion of said film having said marks thereon is passed, said marks being opaque to prevent light from passing from said lamp to said cell.

5. A system in accordance with claim 3 in which a sound reproducting system is provided for said projector, said sound reproducing system including a second relay actuated by the impression and elimination of light in said second light path by said marks in synchronism with said first-mentioned relay.

6. A system for tentatively editing a roll of motion picture film having light interrupting marks at the beginnings and ends of selected portions of said roll of film to be eliminated from observation during projection, said system comprising a motion picture projector adapted to advance therethrough said roll of film being edited, means in said projector adapted to form a first light path through an aperture thereof and the portion of film in said aperture, means forming a second light path through which another portion of said film is adapted to pass during the passage of said first-mentioned portion of film through said first light path, and means operated by the interruption of light by one of said marks passing through said second light path for eliminating light from said first-mentioned portion of said film, said last-mentioned means being operated by a succeeding one of said marks for impressing light on said first-mentioned portion of said film.

References Cited in the file of this patent

UNITED STATES PATENTS

| | | |
|---|---|---|
| 1,604,485 | Salim | Oct. 26, 1926 |
| 1,676,600 | Capstaff | July 10, 1928 |
| 1,866,587 | Warren | July 12, 1932 |
| 1,944,024 | Foster et al. | Jan. 16, 1934 |
| 2,005,737 | Foster et al. | June 25, 1935 |
| 2,106,957 | Nielsen | Feb. 1, 1938 |
| 2,116,314 | Jenkins et al. | May 3, 1938 |
| 2,235,029 | Levinson | Mar. 18, 1941 |
| 2,551,482 | Wolk | May 1, 1951 |
| 2,706,218 | Wootten | Apr. 12, 1955 |

OTHER REFERENCES

International Photographer, December 1938, pages 1 and 5.

UNITED STATES PATENT OFFICE

CERTIFICATE OF CORRECTION

September 22, 1959

Patent No. 2,905,048

William Burke Miller

It is hereby certified that error appears in the printed specification of the above numbered patent requiring correction and that the said Letters Patent should read as corrected below.

Column 3, line 8, for "will be" read — will the —; column 3, line 52, for "said sound film" read — sound on said film —.

Signed and sealed this 10th day of May 1960.

(SEAL)
Attest:

KARL H. AXLINE
Attesting Officer

ROBERT C. WATSON
Commissioner of Patents